United States Patent [19]

Becraft et al.

[11] Patent Number: 4,684,198
[45] Date of Patent: Aug. 4, 1987

[54] MODULAR CABLE INTERCONNECTION APPARATUS

[75] Inventors: Arthur D. Becraft, Colts Neck; Howard M. Citron, Oceanport; Joseph E. Tatarski, Point Pleasant, all of N.J.

[73] Assignees: American Telephone and Telegraph Company, New York, N.Y.; AT&T Information Systems Inc., Morristown, N.J.

[21] Appl. No.: 871,180

[22] Filed: Jun. 4, 1986

Related U.S. Application Data

[63] Continuation of Ser. No. 636,721, Aug. 1, 1984, abandoned.

[51] Int. Cl.⁴ .............................................. H02B 1/02
[52] U.S. Cl. .................................... 439/571; 439/638
[58] Field of Search ............ 339/17 M, 125 R, 154 A, 339/126 R, 44 R, 186 M, 198 G, 198 GA, 128 R; 361/344

[56] References Cited

U.S. PATENT DOCUMENTS

| 629,445 | 7/1899 | Hunt | 339/44 R |
|---|---|---|---|
| 3,848,951 | 11/1974 | Michaels et al. | 339/91 R |
| 3,950,058 | 4/1976 | Cronin | 339/75 M |
| 4,090,764 | 5/1978 | Malsby et al. | 339/198 GA X |
| 4,131,330 | 12/1978 | Stupay | 339/125 R |
| 4,150,867 | 4/1979 | Knickerbocker | 339/125 R X |
| 4,201,437 | 5/1980 | Lockyer | 339/126 R X |
| 4,238,140 | 12/1980 | Cairns et al. | 339/147 R X |
| 4,326,107 | 4/1982 | Perna | 179/98 |
| 4,371,757 | 2/1983 | Debortoli et al. | 179/98 |

Primary Examiner—Eugene F. Desmond
Attorney, Agent, or Firm—John A. Caccuro

[57] ABSTRACT

A cable connection unit includes a mounting arrangement for holding a variety of modular interconnection units for interconnecting a variety of communication cables. Each interconnection unit has the same length and a width which is an integer multiple of the width of the narrowest interconnection unit. The mounting arrangement can be mounted to a plate surface or to an apparatus enclosure having cable entry and exit opening and a moveable front panel. The apparatus enclosure perimeter includes a mortise and tenon to enable mechanical interconnection to one or more additional housing enclosures.

14 Claims, 13 Drawing Figures

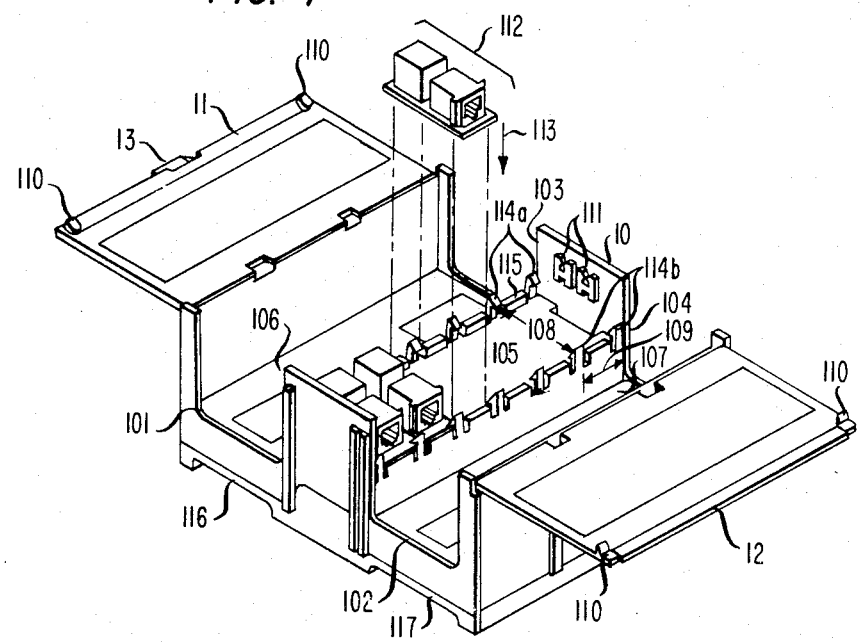

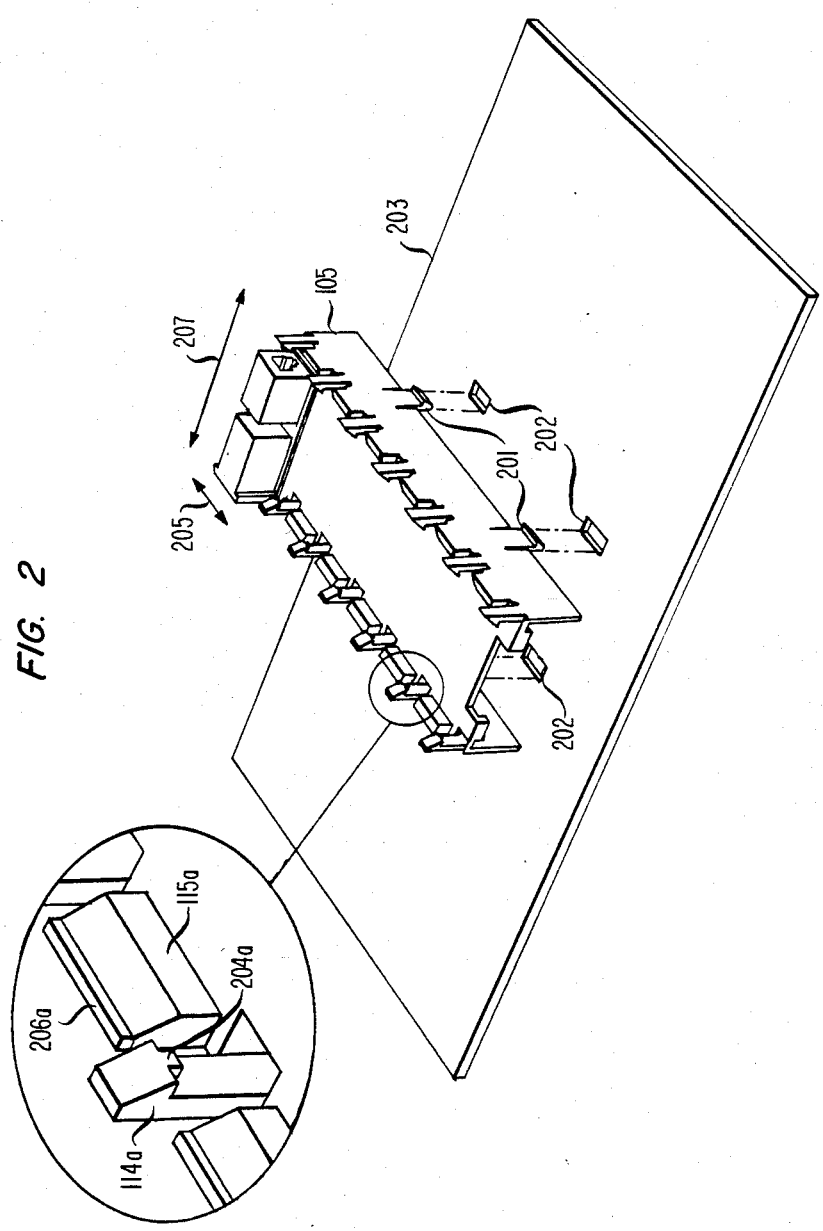

MODULAR CABLE INTERCONNECTION APPARATUS

This application is a continuation of application Ser. No. 636,721, filed Aug. 1, 1984, now abandoned.

TECHNICAL FIELD

This invention relates to mounting arrangements for communication wiring apparatus and more particularly to a cable connection arrangement having modular interconnection units for interconnecting communication cables.

BACKGROUND OF THE INVENTION

Typically communication systems utilize building or premises wiring distribution arrangements to interconnect terminals, station sets and central office (CO) lines to the system controller unit. These premises wiring distribution arrangements are either installed when the building is constructed or later when the communication system is added to the building. Often a company or building tenant may decide to change communication systems or to add a new communication capability or service requiring a change to the premises wiring distribution arrangement. When this occurs the result is often a "rats nest" of different wires and connectors which is disorganized, unprotected and occupies too much space. Moreover, the nest grows each time a change is made to the system. What is desired is apparatus which provides an easily changeable organized cable (wires, fiber optics, etc.) interconnection arrangement.

SUMMARY OF THE INVENTION

The present invention solves the above-described problem using a cable connection unit comprising an apparatus mounting arrangement for mounting one or more of a group of modular interconnection units each including a cable termination at one end electrically connected to a cable termination at a second end. Each of the modular interconnection units has the same length and a width which is an integer multiple of the width of the narrowest modular interconnection unit of the group. The cable terminations at either end may be any of a variety of standard connection means.

The mounting arrangement includes a plurality of retaining clips arranged in two rows, the rows spaced apart by a distance equal to the length of an interconnecting unit, and adjacent retaining means in each row having a spacing about equal to the width of the narrowest interconnection unit for mounting any interconnection unit between two retaining clips on each row.

One embodiment of the cable connection unit includes a modular housing enclosure (apparatus enclosure) for connecting the mounting arrangement therein. This modular housing enclosure may include mechanical interconnection apparatus thereon to enable connection to one or more additional housing enclosures.

BRIEF DESCRIPTION OF THE DRAWING

The operation of the present invention will be more fully appreciated from the detailed description which references the drawings in which:

FIG. 1 illustrates one embodiment of a cable connection unit according to the present invention;

FIG. 2 illustrates the apparatus mounting arrangement used for mounting the modular interconnection unit;

FIG. 3 shows the details of the apparatus on the mounting arrangement used to mount a modular interconnecting unit;

DETAILED DESCRIPTION

Figure 4:
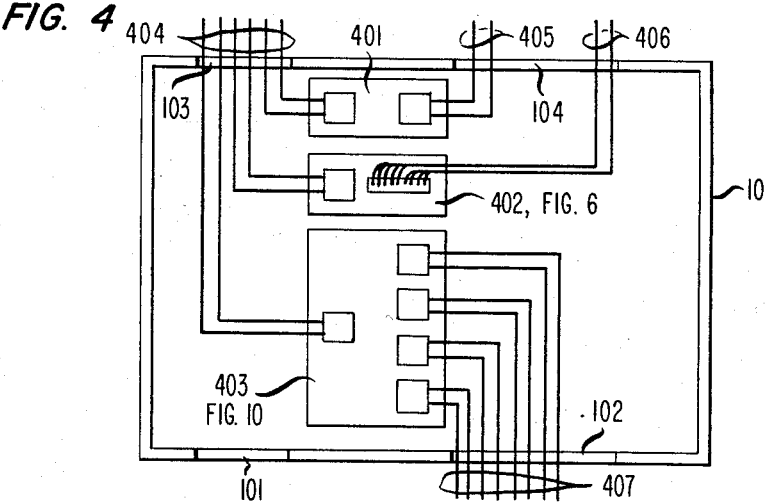
FIG. 4 shows a typical interconnection of several types of cables and connectors using the present invention.

Shown in FIG. 1 is one embodiment of the present invention. Apparatus enclosure 10 includes two moveable doors 11, 12 for gaining access to the jack field or apparatus mounting arrangement 105 and cable ways (106, 107) of the enclosure. The doors are held closed using posts 110 which engage clips 111 on apparatus enclosure 10.

In one embodiment the doors can be marked to indicate to the user the type of terminations the apparatus enclosure houses (e.g., line, port, station, etc.). Additionally, since apparatus enclosure 10 is divided into two halves, one half may house the permanent housing wiring and the other half the connection to a user administered communication system. Thus, the building wiring section may include a door (12) without a handle which makes it inaccessible to unfamiliar users, while the other door (11) is accessible to all using handle 13. This arrangement provides a security against unwarranted access to the enclosure. Cable entry and exit openings 101–104 provide cable access to apparatus enclosure 10 and jack field 105. Thus, cables from a communication system controller can connect via jack field 105 to the building wiring cables which connects to station equipment and/or central office lines. Apparatus enclosure 10 may also provide additional cable ways 116 and 117 which enable cables to pass between apparatus enclosure 10 and the surface to which it is mounted.

Figure 10:
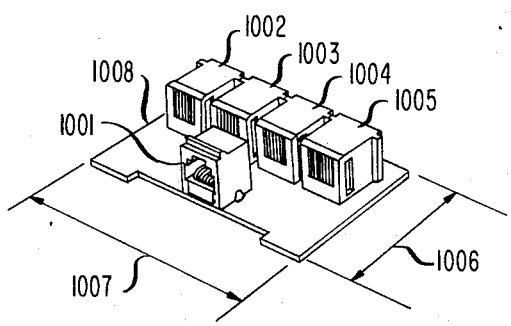
Figure 11:
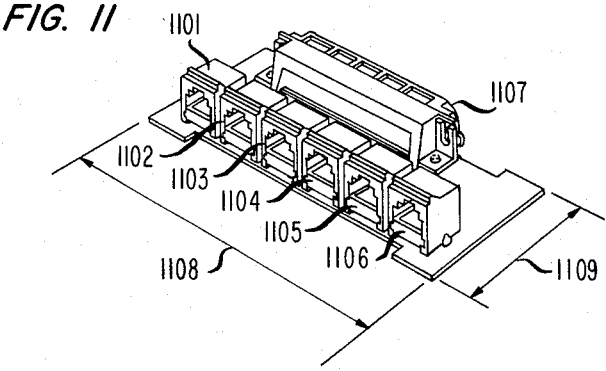
Figure 12:
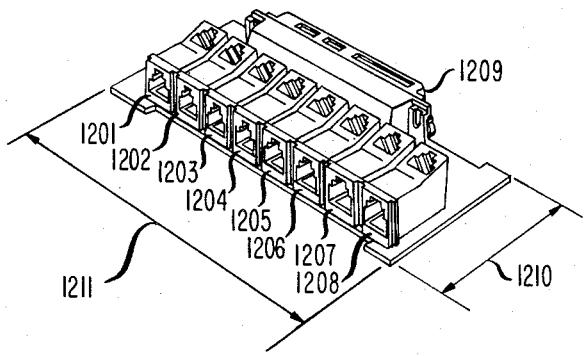

Apparatus enclosure 10 is designed to house an apparatus mounting arrangement to hold a variety of modular interconnection apparatus or units (e.g., 112) including cut down (or insulation displacement) connecting blocks (FIG. 6), modular jacks (FIGS. 6, 7, 8 and 10) and 25-pair cable connectors (FIGS. 11 and 12). These modular interconnection units all have a common length which enable them to fit into clips (e.g., 114) in the apparatus mounting arrangement or 105 of the apparatus enclosure. Therefore, any building wiring run that terminates in cut down or insulation displacement connecting blocks, modular jacks, or 25-pair cable connectors can be terminated in jack field 105. The apparatus mounting arrangement may accommodate other connection arrangements providing they are designed to fit into the clips 114 of the apparatus mounting arrangement.

As will be discussed in detail later, all of the interconnection units have the same length 108 as the jack field 105 and the width is a multiple of the width 109 of the narrowest unit. The spacing of clips 114 is the same dimension as 109 to facilitate the mounting of any of the variety of interconnection units. Obviously, these dimensions and those of the apparatus enclosure may be adjusted to meet the particular requirements of the application. Moreover, the apparatus enclosure can also house transmission electronics which could fit into the apparatus mounting arrangement or jack field location. Additionally, the apparatus mounting arrangement 105 can be removed and circuit boards can be directly screwed or snapped into the apparatus enclosure 10. Obviously apparatus enclosure 10 can be sized to accommodate larger or smaller numbers of interconnecting units.

FIG. 2 illustrates apparatus mounting arrangement 105 according to the present invention for mounting one or more modular interconnection units. Mounting arrangement 105 also inclues connecting means (i.e., four retaining clips 201) which enables the arrangement to be mounted to mounting connecting means (i.e., the four holes 202) located on mounting plate 203 or housing enclosure 10 of FIG. 1.

The retaining clips (e.g., 114a, 114b) and the pedestals (e.g., 115a, 115b) are designed to securely hold the modular interconnecting units. A separator tab (e.g., 204) on each retaining clip insures that a mounted interconnecting unit is correctly positioned in the direction 205 between the retaining clips. Each pedestal also has a vertical post section (e.g., 206) which insures that a mounted interconnecting unit is firmly supported in the direction 207 to absorb the stress when cables are mounted thereto.

FIG. 3 illustrates a view looking from one end of the mounting arrangement and shows the retainer clips 114a and 114b used to hold the variety of modular interconnection units. FIG. 1 illustrates how an interconnection unit such as 112 is mounted into apparatus enclosure 10 by moving it in the direction 113. As will be described in a later paragraph, 301 and 302 of the modular interconnection unit 112 may be any one of a variety of cable termination means (e.g., modular jacks or insulation displacement connectors) mounted to and electrically interconnected by a printed wiring board 303. When such an interconnecting unit is moved in the direction 113 the bottom edges 304 and 305 of the ends of printed wiring board 303 come into contact, respectively, with the sloping surfaces 306 and 307 of clips 114a and 114b. These edges cause the clips 114a and 114b to deflect outward and enable the printed wiring board 303 to finally reach the top surface of pedestals 115a and 115b whereupon edges 311 and 312, respectively, of 114a and 114b snap-over to hold printed circuit board 303. The pedestals 115a and 115b are shown with the vertical post sections 206a and 206b in dotted lines since they are hidden by retaining clips 115a and 115b, respectively. Note how the printed circuit board 105 is positioned between clip 114a, pedestal 115a and clip 114b, pedestal 115b.

Figure 8:

Removal is effected by pushing the printed wiring board to the left or right thereby deflecting the clips 114a and 114b outward so the opposite end will clear its clips. Once interconnection unit 112 is in place, cables having mating connectors can be connected to jacks 301 and 302. Obviously, other mounting arrangements can be utilized to mount the interconnecting units 112 to apparatus enclosure 10 without deviating from the present invention. For example, a one piece interconnecting unit as shown in FIG. 8 can be built with a moulded housing which encapsulates the electrically connected connectors 201 and 202.

FIG. 4 shows an illustrative example of apparatus enclosure 10 having a modular jack 401 (FIG. 6), a cut down or insulation displacement 402 (FIG. 5) and multiple modular 403 (FIG. 9) type interconnecting units for connecting, respectively, a 4-pair cable terminated in a modular plug 405, 4-pair cable without a connector to a four pair cable 406 and four 1-pair cables 407 to a four pair cable. Cables 404 enter the apparatus enclosure via opening 103 and occupy cable way or trough 106. Similarly, cables 405 and 406 enter via opening 104 while cable 407 enters via opening 102 and both occupy cable trough 107.

Figure 5:
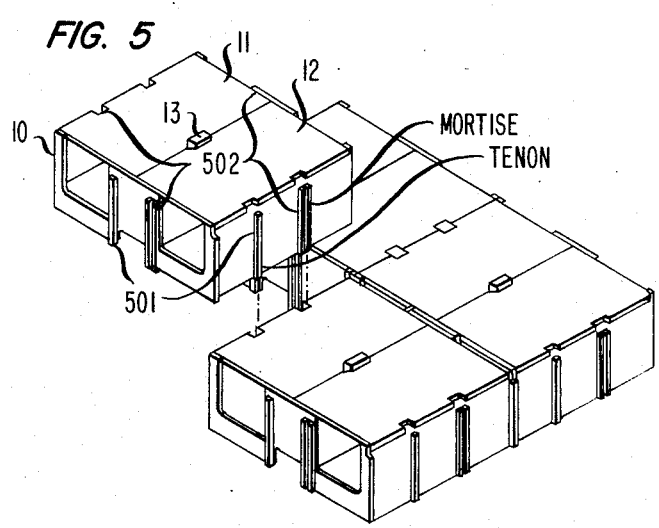
FIG. 5 shows a modular housing enclosure having apparatus thereon to enable mechanical connection to one or more additional housing enclosures.

FIG. 5 illustrates the tenon 501 and mortise 502 which exists on the top, bottom and sides of mounting apparatus 10 which enables multiple apparatus enclosures to be adjacently mounted together in a vertical or horizontal manner as shown. Using this modular apparatus enclosure 10 a compact, user accessible interconnection may be provided between the wiring of larger communication system and the associated building wiring. FIG. 5 also shows apparatus enclosure 10 with its doors 11 and 12 closed. As noted handle 13 enables the user to open door 11 for access only to the left side of apparatus enclosure 10.

Figure 6:
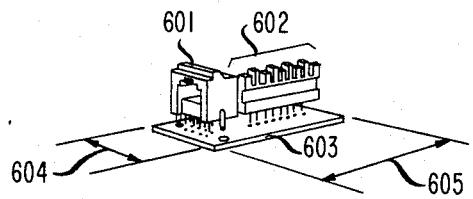
FIGS. 6–13 show a variety of interconnecting units and associated apparatus (FIGS. 9, 13) in accordance with the present invention.

FIGS. 6 through 13 show various interconnecting or adapter units. FIG. 6 shows one type of interconnecting unit having a standard 4-pair modular station jack 601 and standard cut down or insulation displacement connecting block 602 mounted to and interconnected via printed wiring board 603. As previously noted, one type of interconnecting unit may have an insulation displacement connecting block 602 at both ends.

As shown, the terminals of jack 601 and block 602 provide the means for mounting these pieces to printed wiring board 603 and for making connection to the printed circuit paths thereon. The dimensions 604 and 605 correspond, respectively, to the mounting dimensions 109 and 108 of FIG. 1.

Figure 7:
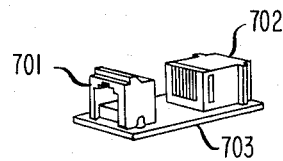

FIG. 7 shows a second type of interconnecting unit, including station jacks 701 and 702 connected to printed wiring board 703.

FIG. 8 shows a one piece moulded housing interconnecting unit having connecting jacks at each end moulded therein along with the associated interconnecting wires. A moulded foot 801 has the same dimensions (i.e., 108 and 109) and having the same thickness as the printed circuit board (e.g., 303 or 703). This foot is used to enable the mounting of the interconnecting unit between the retaining clips (114a, 114b) and pedestals (115a, 115b). Any type of plastic material can be used for this one piece moulded housing.

Figure 9:
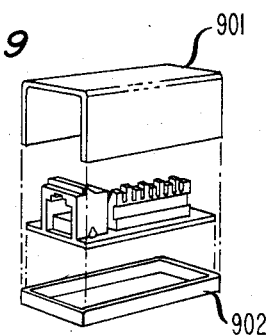

In circumstances where only a single interconnecting unit of the type of FIG. 6 or FIG. 7 is needed it may be housed as shown by FIG. 9. FIG. 9 shows a housing comprising cover 901 which snaps over base 902 which may be permanently attached to the building structure using a suitable fastener (e.g., double sided tape).

FIG. 10 shows an interconnecting unit including a 4-pair modular station jack 1001 connected to four 1-pair standard modular station jacks 1002-1005. Note the dimension 1006 corresponds to dimension 108 of FIG. 1 while dimension 1007 is an integer number times the dimension 109 of FIG. 1. When mounted this interconnecting unit would occupy multiple mounting locations as shown by 403 of FIG. 4. Note, the printed circuit board 1006 is notched on the connector sides to enable the unit to be mounted without interference from the separator tabs (204 of FIG. 2) of the interior retaining clips. Thus, only the retaining clips located at the corners of the printed circuit board 1006 hold the unit to the mounting arrangement 105.

FIG. 11 shows an interconnecting unit including six 4-pair modular jacks 1101–1106 connected to a standard 25-pair connector 1107. Dimension 1109 would correspond to dimension 108 of FIG. 1 and dimension 1108 would be an integer multiple of the dimension 109 of FIG. 1.

Shown in FIG. 12 is another interconnecting unit including eight, dual 1-pair modular line jacks 1201-1208 connected to a standard 25-pair conenctor 1209. Again dimension 1210 would correspond to dimension 108 of FIG. 1 and dimension 1211 would correspond to an integer multiple of the dimension 109 of FIG. 1.

Figure 13:
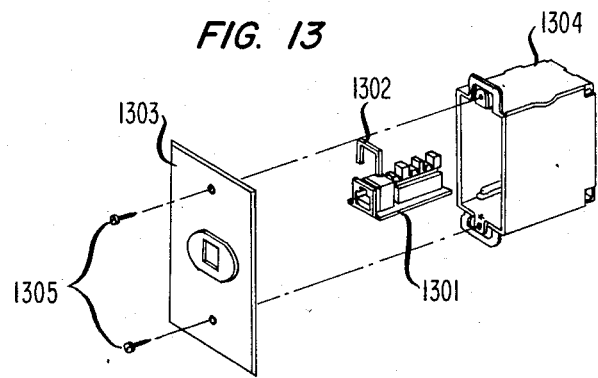

Shown in FIG. 13 is an interconnecting unit 1301 similar to FIG. 6 or FIG. 7 except that it includes clip means 1302 for mounting the unit into a simplex plate 1303 for mounting into a standard simplex wall outlet 1304 with screws 1305. The clip means 1302 and the lip or equivalent on the interconnecting unit face used to mount the unit can be implemented in a variety of well known ways. Additionally, plate 1303 can be embodied to work with any type of electrical box: floor, duct and duplex.

The above interconnecting units can convert any number of pair connector and/or cable from and to any other number of pair connector and/or cable. Using the above described interconnecting units as a reference, it is obvious that the techniques utilized can be extended to provide interconnection to almost any type of existing connector and cable to any other, and probably to any similarly constructed new connection or cable. It is contemplated that circuitry may be utilized as part of the interconnecting units which may enable protocol conversion, multiplexing, optical to electrical conversion, coax eliminator, etc.

Thus, what has been disclosed is merely illustrative of the present invention. Other arrangements and methods can be implemented by those skilled in the art without departing from the spirit and scope of the present invention.

What is claimed is:

1. A cable connection arrangement for interconnecting communication cables comprising
a group of modular interconnection units, each unit adapted to terminate a cable at each end of a first side thereof using any one of a variety of cable terminating means, each unit having the same end-to-end length, each unit having a different width which is equal to an integer multiple of the width of the narrowest unit in said group, and each unit adapted to be mounted by the ends of said first side below said cable termination means; and
mounting arrangement adapted for mounting one or more of said units each having the same or different widths, said mounting means including a plurality of retaining means arranged in two rows spaced apart by the length of said units and adjacent retaining means in each row having a spacing substantially equal to the width of the narrowest unit, each of said one or more of said units being held at each respective end of said first side between two retaining means on each row such that the cable termination means of said unit are located above a mounting plane formed by the two rows of the retaining means.

2. The cable connection arrangement of claim 1 further comprising
a mounting surface having connecting means thereon, and
said mounting arrangement further including connecting means for mating with said surface connecting means to affix said mounting arrangement to said mounting surface.

3. The cable connection arrangement of claim 2 wherein said mounting surface is part of an apparatus enclosure having a moveable front panel for accessing the interior of said enclosure, and a cable opening to said enclosure.

4. The cable connection arrangement of claim 3 wherein said apparatus enclosure includes separate cable entry and exit openings each opening accessible using different moveable front panels.

5. The cable connection arrangement of claim 4 wherein only one of said movement front panels includes a handle.

6. The cable connection arrangement of claim 3 wherein said apparatus enclosure includes connection means for enabling connection to an adjacent apparatus enclosure.

7. The cable connection arrangement of claim 6 wherein said apparatus enclosure includes a top, bottom and two sides each including said connection means.

8. The cable connection arrangement of claim 6 wherein said apparatus enclosure connecting means includes a mortise and a tenon and which connects, respectively, to a tenon and a mortise of said adjacent apparatus enclosure.

9. The cable connection arrangement of claim 1 wherein said unit includes a connector means.

10. A group of rectangularly shaped modular interconnection units, each unit comprising
means for, terminating a cable at first and second ends of a top side of said unit using any one of a variety of cable terminating means,
means located at said first and second ends below said cable termination means on a bottom side of said unit for mounting said unit in a snap mounting arrangement using the corners formed by the bottom side and said first and second ends of said unit such that when the unit is mounted the cable termination means of said unit are located above said mounting arrangement, and wherein
each of said units has the same length and each unit has a different width which is equal to an integer multiple of the width of the narrowest unit in said group.

11. The group of modular interconnection units of claim 10 wherein said terminating means is a connector means.

12. The group of modular interconnection units of claim 11 wherein said connector means includes means for affixing said interconnecting unit to a mounting plate.

13. A rectangularly shaped interconnection unit comprising
means for terminating a cable at a first and a second end of a top side of said unit using any one of a variety of cable terminating means,
means located at said first and second ends below said cable termination means on a bottom side of said unit for mounting said unit in a snap mounting arrangement using the corners formed by the bottom sides and said first and second ends of said unit such that when the unit is mounted the cable termination means of said unit are located above a plane formed by the snap mounting arrangement.

14. The interconnection unit of claim 13 further comprising means for affixing an end of said interconnection unit to a mounting plate so that one of said cable termination means is accessible therethrough.

* * * * *